US012473966B2

(12) United States Patent
Gloede

(10) Patent No.: US 12,473,966 B2
(45) Date of Patent: Nov. 18, 2025

(54) DRIVE DEVICE FOR AN ELECTRIFIED VEHICLE AXLE

(71) Applicant: AUDI AG, Ingolstadt (DE)

(72) Inventor: Harald Gloede, Pförring (DE)

(73) Assignee: AUDI AG, Ingolstadt (DE)

(*) Notice: Subject to any disclaimer, the term of this patent is extended or adjusted under 35 U.S.C. 154(b) by 145 days.

(21) Appl. No.: 18/262,294

(22) PCT Filed: Jun. 20, 2022

(86) PCT No.: PCT/EP2022/066646
§ 371 (c)(1),
(2) Date: Jul. 20, 2023

(87) PCT Pub. No.: WO2023/274758
PCT Pub. Date: Jan. 5, 2023

(65) Prior Publication Data
US 2024/0084886 A1 Mar. 14, 2024

(30) Foreign Application Priority Data

Jul. 2, 2021 (DE) .................... 10 2021 117 059.1

(51) Int. Cl.
F16H 57/02 (2012.01)
B60K 1/00 (2006.01)
(Continued)

(52) U.S. Cl.
CPC ............. *F16H 57/028* (2013.01); *B60K 1/00* (2013.01); *B60K 11/02* (2013.01);
(Continued)

(58) Field of Classification Search
CPC ............... F16H 57/028; F16H 57/0476; F16H 2057/02026; F16H 2057/02034;
(Continued)

(56) References Cited

U.S. PATENT DOCUMENTS 5,821,653 A * 10/1998 Kinto ...................... B60K 1/00
310/58
6,135,245 A 10/2000 Kurasako et al.
(Continued)

FOREIGN PATENT DOCUMENTS

CN 212677022 U 3/2021
DE 696 23 111 T2 12/1996
(Continued)

OTHER PUBLICATIONS

International Search Report issued in International Application No. PCT/EP2022/066646 dated Oct. 4, 2022
(Continued)

*Primary Examiner* — Syed O Hasan
(74) *Attorney, Agent, or Firm* — STAAS & HALSEY LLP

(57) ABSTRACT

The examples relate to a drive device for an electrified vehicle axle of a vehicle, with an electric machine which outputs via a transmission to drive shafts which lead to vehicle wheels of the vehicle axle, and with a coolant and/or lubricant module which supplies the electric machine and/or the transmission with coolant and/or lubricant. The electric machine, the transmission and the module being joined together to form an structural unit, in which the electric machine and the coolant/lubricant module may be flange-connected to the transmission in a manner to be spaced apart axially from one another, and, on its side which lies axially opposite the transmission. The electric machine having a radially protruding cantilever which bridges an axial spacing (Δx) from the coolant/lubricant module and which, at its free cantilever end, is attached in a force-transmitting manner via at least one bolt location (A) to the coolant/lubricant module, for example, to reduce operationally induced vibrations in the structural unit. In an example, at the cantilever end, a stop element may be provided with an adjustable stroke (Continued)

between a non-use position (N) and a supporting position (S). Before the bolt location (A) is tensioned fixedly, the stroke of the stop element can be adjusted, using up a tolerance gap, until in contact with the module supporting face, with the result that the cantilever end and the module can be braced to one another in a manner which is free from tolerance-induced component deformations.

11 Claims, 7 Drawing Sheets

(51) Int. Cl.
  *B60K 11/02* (2006.01)
  *F16H 57/028* (2012.01)
  *F16H 57/04* (2010.01)
(52) U.S. Cl.
  CPC .... *F16H 57/0476* (2013.01); *B60K 2001/001* (2013.01); *F16H 2057/02026* (2013.01); *F16H 2057/02034* (2013.01); *F16H 2057/02052* (2013.01)
(58) Field of Classification Search
  CPC ....... F16H 2057/02052; F16H 63/3458; F16H 57/029; F16H 1/20; B60K 1/00; B60K 11/02; B60K 2001/001; B60K 17/08
  See application file for complete search history.

(56) References Cited

U.S. PATENT DOCUMENTS

| | | | |
|---|---|---|---|
| 8,678,969 B2* | 3/2014 | Sato | B60L 50/00 475/150 |
| 9,694,664 B2 | 7/2017 | Hoshinoya et al. | |
| 2018/0180164 A1* | 6/2018 | Hagino | B60K 6/445 |
| 2022/0145980 A1* | 5/2022 | Oda | B60K 6/405 |

FOREIGN PATENT DOCUMENTS

| | | |
|---|---|---|
| DE | 197 39 668 A1 | 9/1997 |
| DE | 100 34 400 A1 | 1/2002 |
| DE | 198 37 446 B4 | 4/2004 |
| DE | 10 2004 014 787 A1 | 10/2005 |
| DE | 10 2016 222 094 A1 | 5/2018 |
| DE | 10 2017 004 778 A1 | 11/2018 |
| DE | 10 2018 106 799 A1 | 9/2019 |
| EP | 1 414 134 A2 | 4/2004 |
| EP | 1 503 088 A1 | 2/2005 |
| JP | 2017-67296 | 4/2017 |
| WO | WO 2012/120079 A1 | 9/2012 |
| WO | WO 2019/238343 A1 | 12/2019 |

OTHER PUBLICATIONS

German Office Action issued in German Application No. 10 2021 117 059.1 dated Oct. 31, 2022.

* cited by examiner

DRIVE DEVICE FOR AN ELECTRIFIED VEHICLE AXLE

CROSS-REFERENCE TO RELATED APPLICATIONS

This application is a U.S. national stage of International Application No. PCT/EP2022/066646, filed on Jun. 20, 2022, which claims the priority benefit of German Application No. DE 10 2021 117 059.1 filed on Jul. 2, 2021. Both the International Application and the German Application are incorporated by reference herein in their entirety.

BACKGROUND

1. Field

The described examples of an invention relate to a drive device for an electrified vehicle axle of a vehicle in accordance with an example.

2. Description of the Related Art

An electrified vehicle axle of an at least partially electrically operated, double-track vehicle can have an electric machine which outputs via a transmission to output shafts which lead to vehicle wheels of the vehicle axle. In addition, an oil module is provided which supplies the electric machine and/or the transmission with oil.

In a drive device of the generic type, the electric machine, the transmission and the oil module are joined together to form a frame-shaped, vibration-resistant structural unit. In this structural unit, the electric machine and the oil module are flange-connected to the transmission in a manner which is spaced apart axially from one another. In addition, on its side which lies axially opposite the transmission, the electric machine has a radially protruding cantilever which bridges an axial spacing to the oil module. At its free cantilever end, the cantilever is attached to the oil module in a force-transmitting manner via bolt locations. In this way, operationally induced vibrations can be reduced in the frame-shaped structural unit.

DE 10 2004 014 787 A1 has disclosed an oil module. DE 197 39 668 A1 has disclosed an oil pump module. DE 10 2017 004 778 A1 has disclosed a tolerance-compensating connecting arrangement.

SUMMARY

In an example, a drive device may be provided, in the case of which assembly may be made possible in a simplified way in a manner which is substantially free from component deformations.

Examples of an invention may be described by way of the features recited in the claims.

In an example, a drive device for an electrified vehicle axle has an electric machine, a transmission, and a coolant and/or lubricant module (hereinafter may be referred to as a module) which supplies the electric machine and/or the transmission with coolant and/or lubricant. The electric machine, the transmission and the module may be joined together to form a vibration-resistant, frame-shaped structural unit. In the structural unit, the electric machine and the coolant/lubricant module may be flange-connected to the transmission such that they are spaced apart axially from one another. In addition, the electric machine may have a radially protruding cantilever on a side of the electric machine which lies axially opposite the transmission. This cantilever bridges an axial spacing to the coolant and/or lubricant module. A free cantilever end (may be referred to as cantilever end) may be attached to the coolant and/or lubricant module in a force-transmitting manner via at least one bolt location. In this way, operationally induced vibrations can be reduced in the structural unit. In an example, a stop element may be provided at the cantilever end, the stroke of which stop element can be adjusted between a non-use position and a supporting position. The stop element may be spaced apart from a module supporting face of the coolant and/or lubricant module via a free tolerance gap in the non-use position. In this way, a coolant and/or lubricant module which is still dismantled can be assembled with the structural unit in a manner which is free from interfering contours. Before the bolt location is tensioned fixedly, the stroke of the stop element can be adjusted, using up the tolerance gap, until in contact with the module supporting face. Subsequently, a screwing process follows, in the case of which the cantilever end and the module can be braced to one another in a manner which is free from tolerance-induced component deformations.

In one technical implementation, the bolt location can have a threaded bolt. The latter can be guided through a screw hole of the cantilever end and can be brought by way of its bolt shank into threaded engagement with a module-side internally threaded bore. With regard to a realization which is favorable in terms of installation space, the stop element can be a stop sleeve which may be integrated directly into the bolt location. In this case, the stop sleeve can have a thread-free inner circumference and an outer circumference with an external thread. The stop sleeve can be brought via its external thread into threaded engagement with an internal thread of the cantilever end. In an example, for compactness the stop sleeve can be brought into threaded engagement with an internal thread in the screw hole of the cantilever end. In order to adjust the stroke, the stop sleeve may be actuated by the worker by way of screwing.

In an example, which may be favorable in terms of installation space, the bolt shank of the threaded bolt can be guided directly through the stop sleeve. In the supporting position, the stop sleeve can be moved with its end side until it is in contact with an opening edge region of the module-side internally threaded bore. In this case, the opening edge region of the module-side internally threaded bore forms the module supporting face, with respect to which the stop sleeve is supported in its supporting position.

In the fixedly tensioned state, the cantilever end including the stop sleeve can be supported between the bolt head of the threaded bolt and the opening edge region of the module-side internally threaded bore. In a first variant, the bolt head can be supported directly on the stop sleeve end side which faces away from the module. As an alternative to this, the bolt head can be supported, independently of the stop sleeve, on the opening edge region of the screw hole of the cantilever end.

A simpler assembly actuation of the stop sleeve may be important with regard to a reduced process duration in the assembly operation. Against this background, the stop sleeve can have, on its end side which faces away from the module, a tool attachment, via which the stop sleeve can be actuated by screwing with the aid of a tool. For further simplification of the assembly operation, the tool attachment of the stop sleeve and a tool attachment of the threaded bolt can be of substantially identical configuration. In this way, the stop sleeve and the threaded bolt can be actuated by way of an identical tool.

In one technical implementation, the bolt location can be oriented axially parallel to the electric machine axis or to the module axis. For the further reduction of operationally induced vibrations, the cantilever end can be connected via at least one second bolt location to the module. The screw axis of this bolt location can be oriented at a right angle with respect to the screw axis of the first bolt location.

The second bolt location can have a threaded bolt which can be guided through a screw hole of the cantilever end and can be brought by way of its bolt shank into threaded engagement with a module-side internally threaded bore. In particular, lateral vibrations, that is to say vibrations transversely with respect to the axial direction of the screwing axis of the second bolt location, can be blocked by the second bolt location. To this end, the bolt location can be constructed as follows. An adjusting sleeve with a small hole tolerance can thus be inserted into the screw hole of the cantilever end. The sleeve length of this adjusting sleeve can be of greater dimensions than the screw hole length of the cantilever end. In this way, in the fixedly tensioned state, the adjusting sleeve may be supported between the bolt head and the opening edge region of the module-side internally threaded bore. In addition, the cantilever end is mounted such that it can be adjusted in the axial direction in sliding contact with the adjusting sleeve outer circumference. On account of the small hole tolerance between the adjusting sleeve and the screw hole, lateral vibrations transversely with respect to the axial direction may be largely blocked.

In an assembly process, the electric machine is first of all flange-connected to the transmission. Here, a sufficiently great assembly clearance may be formed between the cantilever end of the electric machine and the transmission. In a first process, the module is introduced without interfering contours into this assembly clearance. A second process subsequently follows, in which the module is advanced in the axial direction by an advancing stroke as far as into an assembly position, in which the flange connection is established between the module and the transmission. In a further third process, the cantilever end is braced to the module at the bolt location.

Moreover, the electric machine may be assigned an electronic power system. The latter can be arranged, in a manner which may be favorable in terms of installation space, on the upper side of the frame-shaped structural unit, and can span the interior space of the frame-shaped structural unit. In this case, in a dual function, a contact housing for electric supply lines can additionally be integrated into the cantilever. With the aid of the electric supply lines, the electronic power system is connected electrically to the electric machine.

BRIEF DESCRIPTION OF DRAWINGS

These and other aspects and advantages will become more apparent and more readily appreciated from the following description of the examples, taken in conjunction with the accompanying drawings of which.

DESCRIPTION

Figure 1:
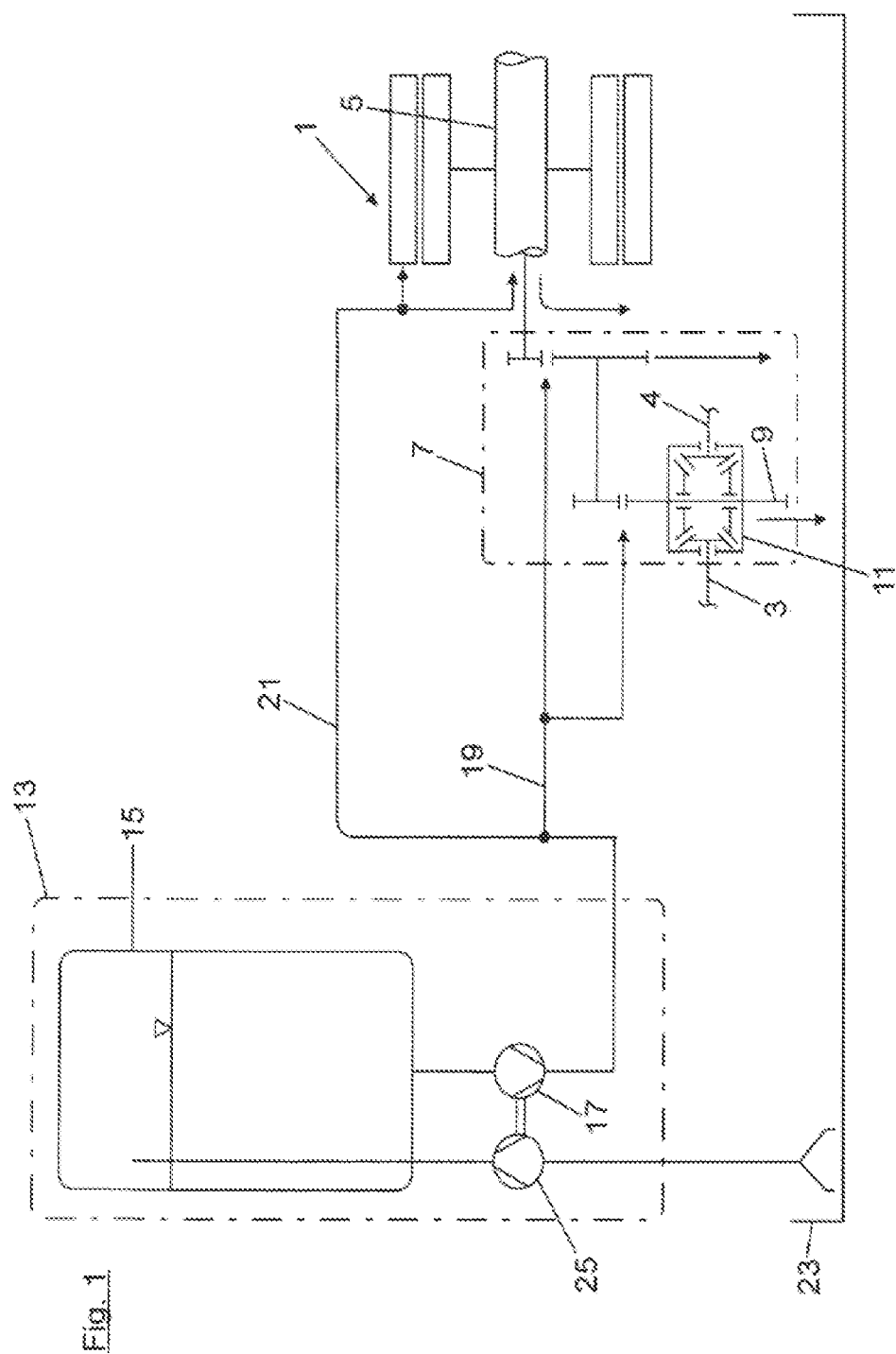
FIG. 1 shows a roughly schematic block circuit diagram of the drive device according to an example.

FIG. 1 shows a simplified block circuit diagram of a drive device for a vehicle axle of a double-track vehicle. The vehicle axle has an electric machine 1 which, in the transverse installation, is arranged axially parallel to the drive shafts 3, 4 which are led to the vehicle wheels. The rotor shaft 5 of the electric machine 1 is drive-connected via a transmission 7 to the two drive shafts 3, 4. In FIG. 1, the transmission 7 has a double spur gear stage which is drive-connected to an input-side gearwheel 9 of an axle differential 11. The axle differential 11 outputs on both sides to the drive shafts 3, 4 which are led to the vehicle wheels. In addition, the drive device may have an oil module 13, the construction of which is described in the following text only in so far as it is necessary for understanding the examples of the invention. Accordingly, the oil module 13 has an oil tank 15 which is connected via a suction line to a pressure pump 17. From the pressure pump 17, a pressure line leads as far as a branch location, at which the pressure line forks into supply lines 19, 21. Via the supply line 19, oil is conducted to tooth engagement locations of the transmission 7. From there, the oil drips off and is collected in a lubricating oil sump 23. Via the supply line 21, the oil is conducted into the electric machine 1. From there, the oil likewise flows in the direction of the oil sump 23. The oil which is collected in the oil sump 23 is conducted back into the oil tank 15 with the aid of a return pump 25.

Figure 2:
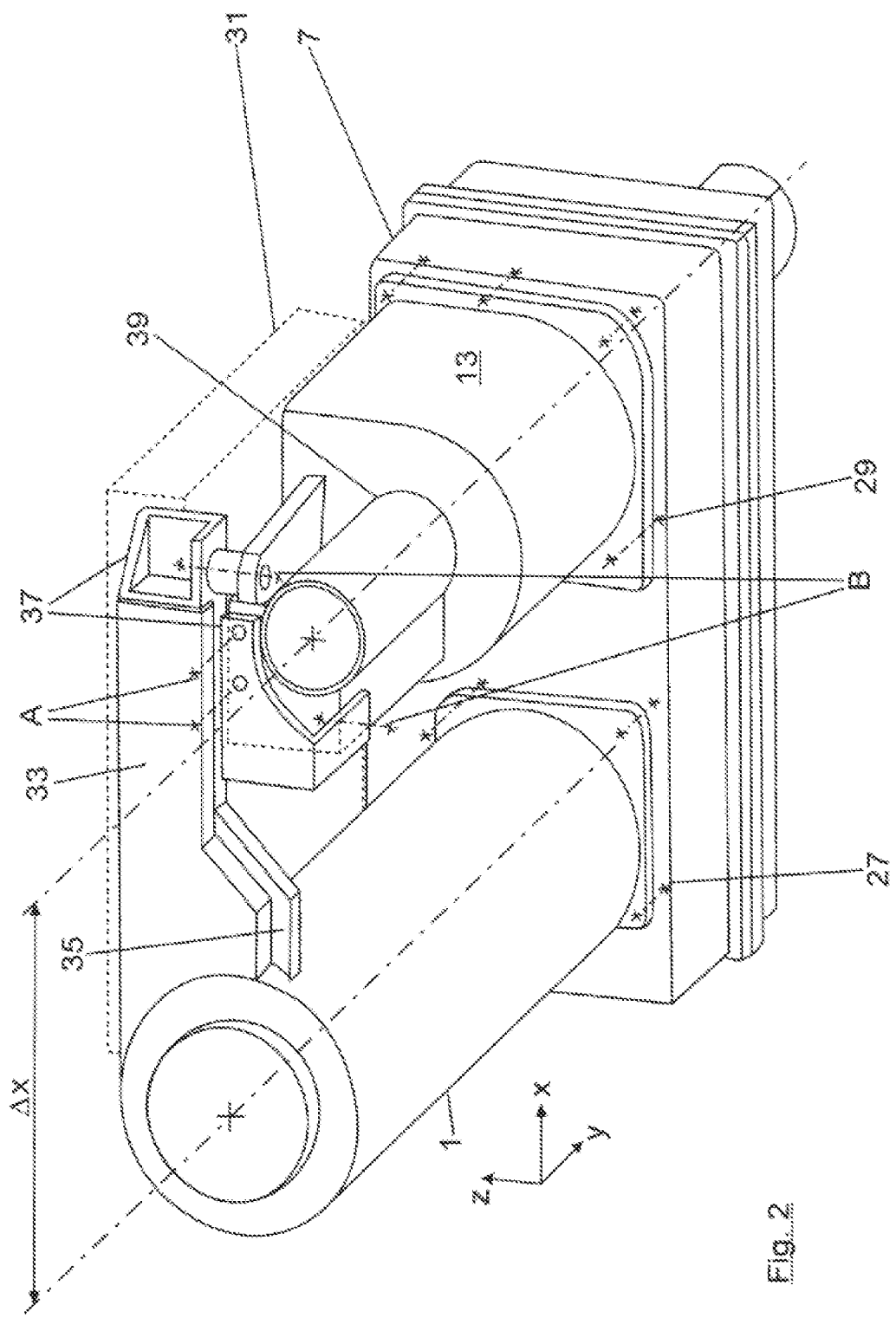
FIG. 2 shows a perspective illustration of the drive device in the assembled state.

In FIG. 2, the electric machine 1, the transmission 7 and the oil module 13 are joined together to form a frame-shaped structural unit. In the structural unit, the electric machine 1 and the oil module 13 are flange-connected to the transmission 7 via flange connections 27, 29 such that they are spaced apart from one another over an axial spacing $\Delta x$. The electric machine 1 may be assigned an electronic power system 31 (indicated using a dotted line). This is situated on the upper side of the frame-shaped structural unit and spans the interior space of the frame-shaped structural unit. The electronic power system 31 may be connected to the electric machine 1 via electric supply lines which run within a contact housing 33 in FIG. 2. The contact housing 33 may be a constituent part of a cantilever 35 which protrudes radially on the electric machine side which lies axially opposite the transmission 7.

As is apparent from FIG. 2, the cantilever 35 bridges the axial spacing $\Delta x$ to the oil module 13. A free cantilever end 37 may be attached to the oil module 13 in a force-transmitting manner via a total of four bolt locations A, B, in order to reduce operationally induced vibrations in the structural unit.

As is apparent from FIG. 2, the bolt locations may be divided into a total of two first bolt locations A and two second bolt locations B. The screw axes of the first bolt locations A may be oriented in the vertical direction z. The screw axes of the bolt locations B may be oriented in the axial direction of the electric machine 1 or the oil module 13. In FIG. 2, the oil module 13 has a shaft leadthrough 39, through which a drive shaft 3, 4 (not shown) may be guided as far as the respective vehicle wheel.

Figure 3:
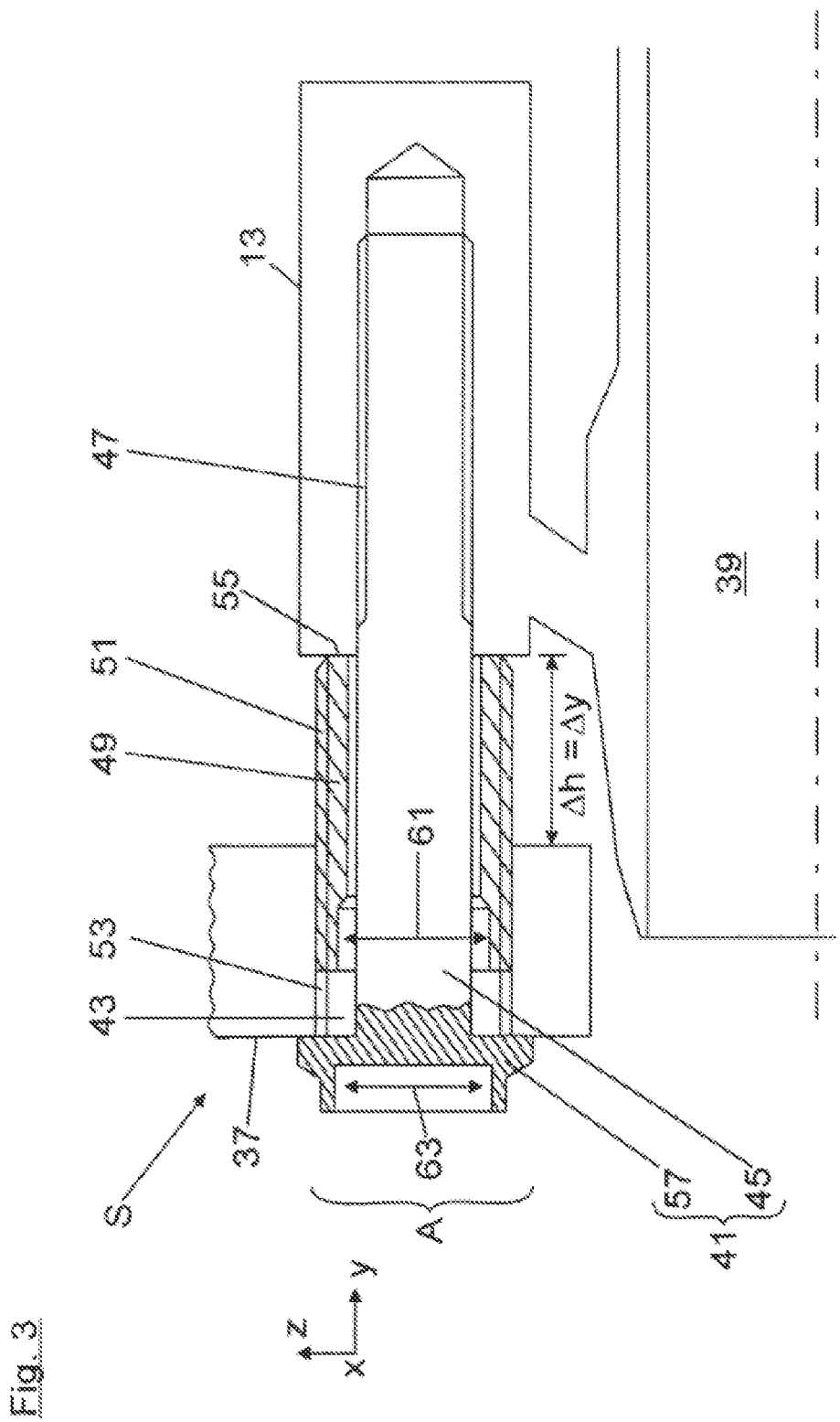
FIGS. 3 and 4 show a bolt location in different operating states.
Figure 4:
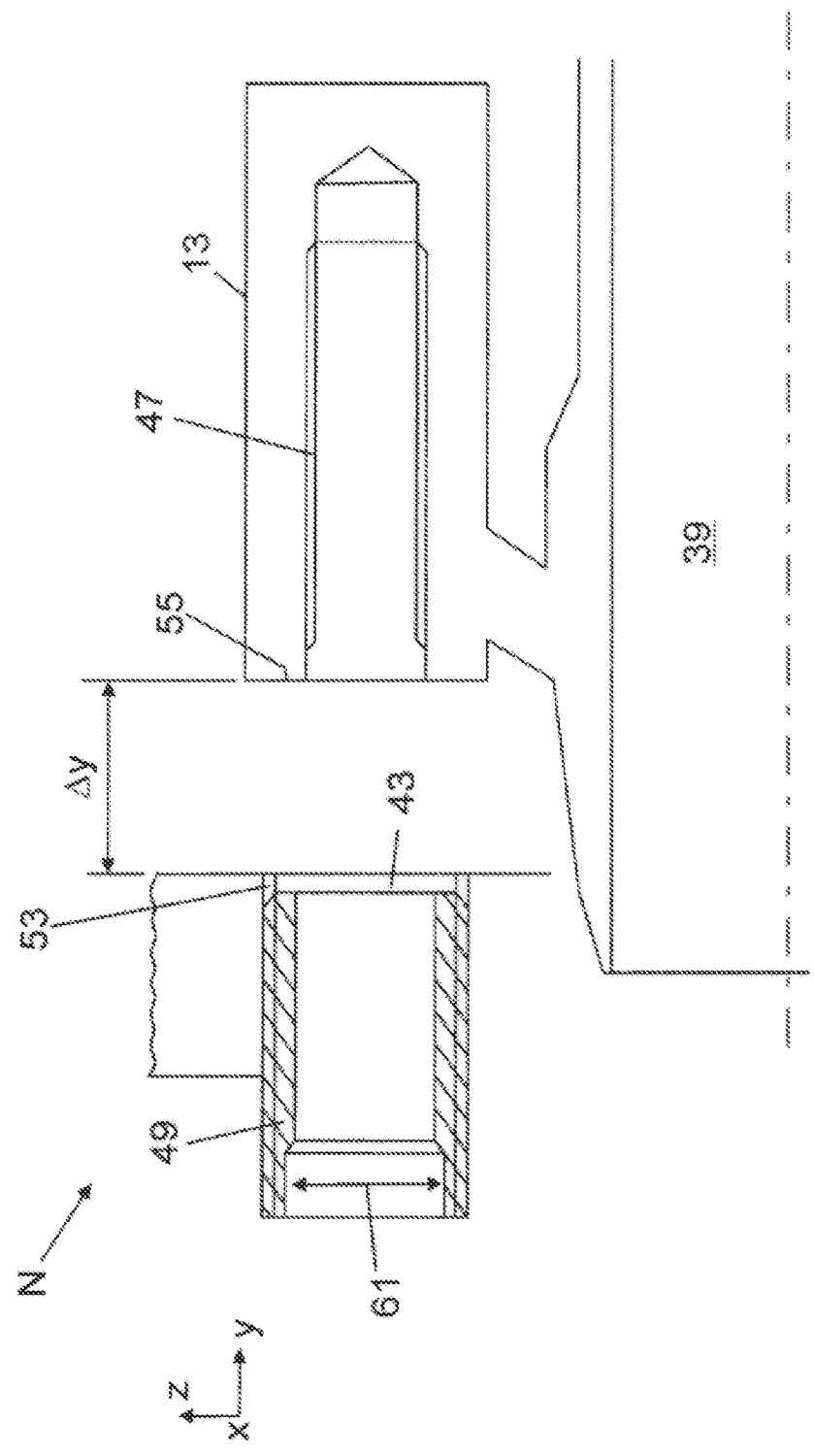

In the following text, the construction of one of the bolt locations A is described on the basis of FIG. 3. Accordingly, the bolt location A has a threaded bolt 41. The latter (threaded bolt 41) may be guided through a screw hole 43 of the cantilever end 37 and may be in threaded engagement by way of its bolt shank 45 with a module-side internally threaded bore 47. Furthermore, the bolt location A is assigned a stop sleeve 49. The stope sleeve 49 has a thread-free inner circumference and an outer circumference with an external thread 51. The stop sleeve 49 is in threaded engagement via its external thread 51 with an internal thread 53 of the screw hole 43 of the cantilever end 37. In FIG. 3, the bolt shank 45 of the threaded bolt 41 may be guided through the stop sleeve 49. By way of actuation by screwing, the stroke of the stop sleeve 49 can be actuated between a non-use position N (shown in FIG. 4) and a supporting position S (shown in FIG. 3). In the supporting position S which is shown in FIG. 3, the stop sleeve 49 is in contact with an opening edge region 55 of the module-side internally threaded bore 47. In FIG. 3, the bolt head 57 of the threaded bolt 41 is supported on the opening edge region of the screw hole 43 of the cantilever end 37. The stop sleeve 49 protrudes with an oversize $\Delta h$ out of the screw hole 43 of the cantilever end 37, by way of which oversize $\Delta h$, the tolerance gap $\Delta y$ (FIG. 4) between the cantilever end 37 and the oil module 13 may be bridged.

The stop sleeve 49 on an end side which faces away from the oil module 13, has a tool attachment 61, via which the stop sleeve 49 can be actuated by screwing. The tool attachment 61 of the stop sleeve 49 and the tool attachment 63 of the threaded bolt 41 are of substantially identical configuration with a polygon socket. Consequently, both the stop sleeve 49 and the threaded bolt 41 can be actuated by way of an identical tool.

Figure 5:
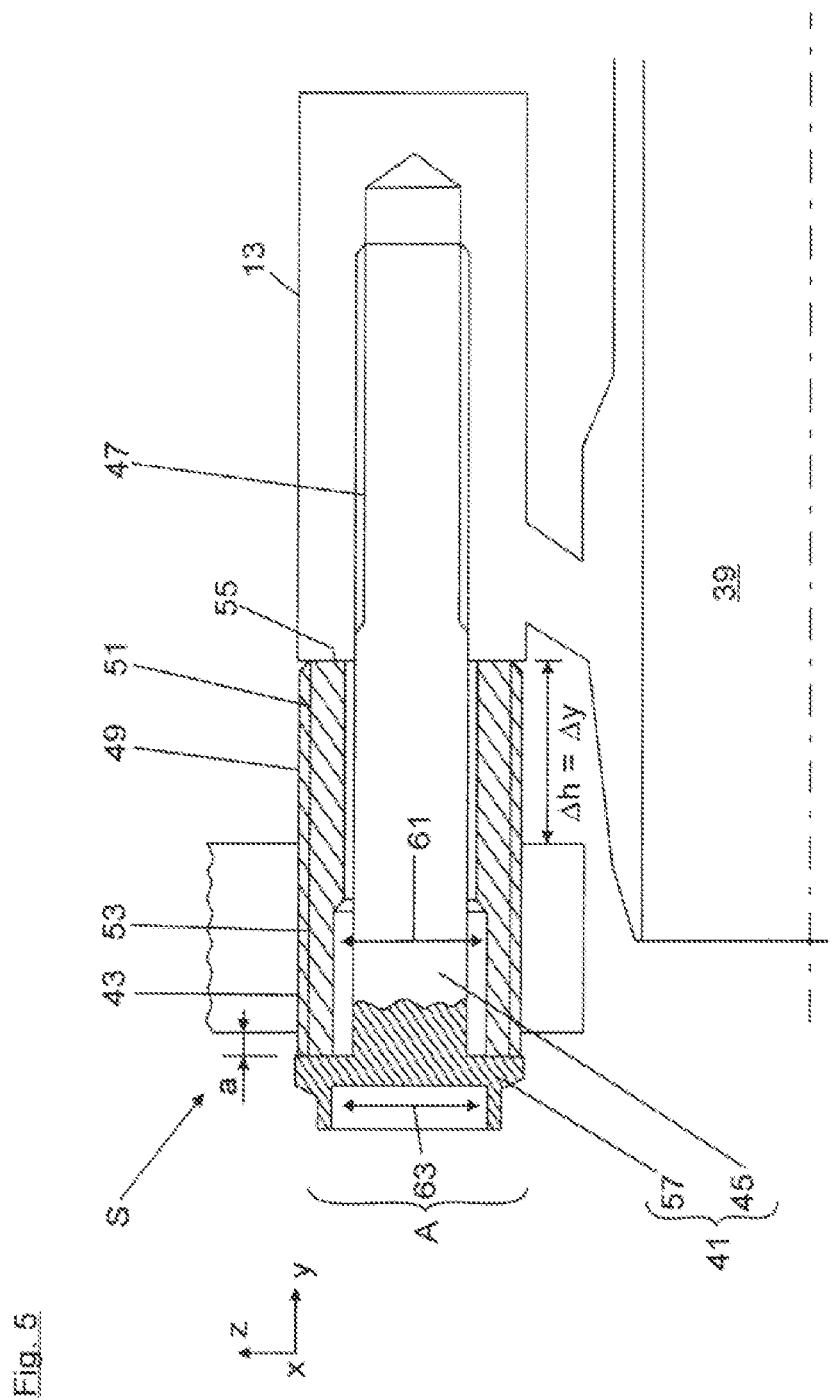
FIG. 5 shows a view in accordance with FIG. 3 of one variant of the bolt location.

In FIG. 3, the end side of the stop sleeve 49 which faces away from the opening edge region 55 of the module-side internally threaded bore 47, is situated within the screw hole 43 of the cantilever end 37. Consequently, in FIG. 3, the bolt head 57 of the threaded bolt 41 may be supported directly on the opening edge region of the screw hole 43 of the cantilever end 37. As an alternative to this, FIG. 5 shows one variant of the bolt location A, in which that end side of the stop sleeve 49 which faces away from the opening edge region 55 of the module-side internally threaded bore 47, protrudes with an overhang—a—beyond the cantilever end 37. In this case, the bolt head 57 of the threaded bolt 41 may be supported directly on the stop sleeve 49.

Figure 6:
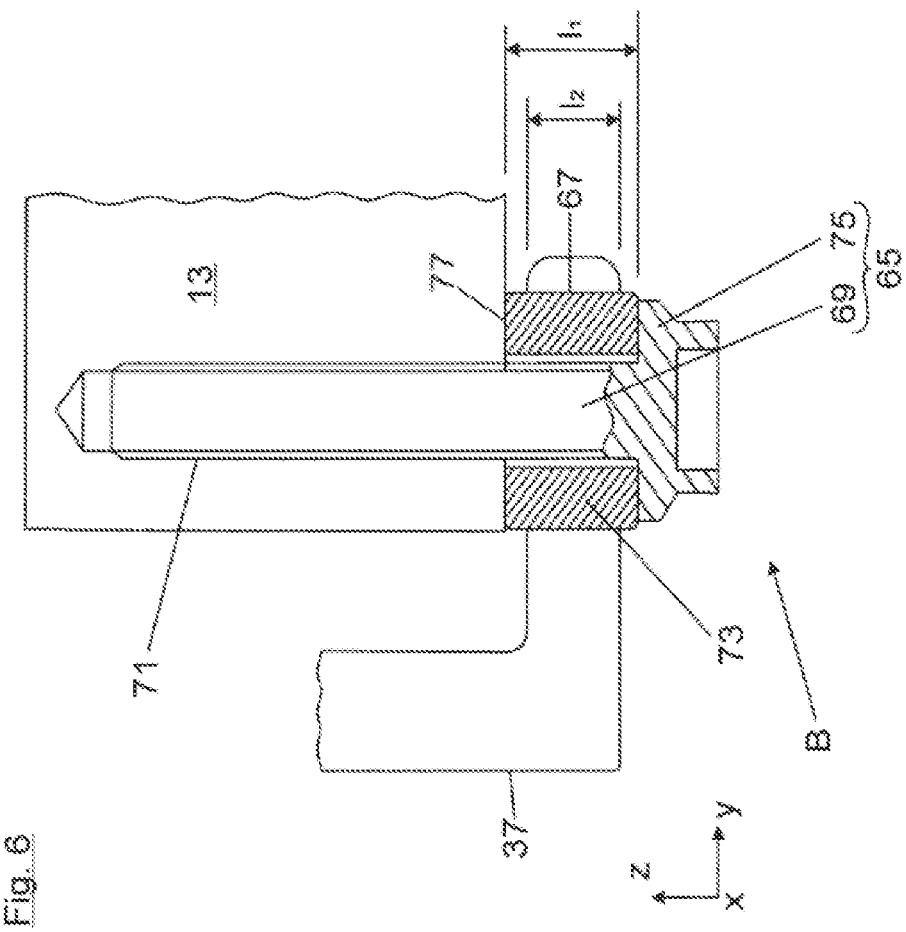
FIG. 6 shows a further bolt location.

FIG. 6 shows the construction of one of the second bolt locations B. Accordingly, the second bolt location B has a threaded bolt 65 which is guided through a screw hole 67 of the cantilever end 37 and is in threaded engagement by way of its bolt shank 69 with a module-side internally threaded bore 71. An adjusting sleeve 73 with a small hole tolerance may be inserted into the screw hole 67 of the cantilever end 37. The sleeve length $l_1$ of this adjusting sleeve 73 may be of greater dimensions than the screw hole length $l_2$ of the cantilever end 37. FIG. 6 shows a fixedly tensioned state, in the case of which the adjusting sleeve 73 may be supported between the bolt head 75 of the threaded bolt 67 and an opening edge region 77 of the module-side internally threaded bore 71. In this case, the cantilever end 37 is in sliding contact with the smooth cylindrical adjusting sleeve outer circumference, which results in a floating mounting in the axial direction, but lateral vibrations transversely with respect to the axial direction are largely blocked.

Both the outer circumference and the inner circumference of the adjusting sleeve 73 may be realized in a smooth cylindrical or thread-free manner. The threaded bolt 65 therefore extends through the adjusting sleeve 73 without threaded engagement.

Figure 7:
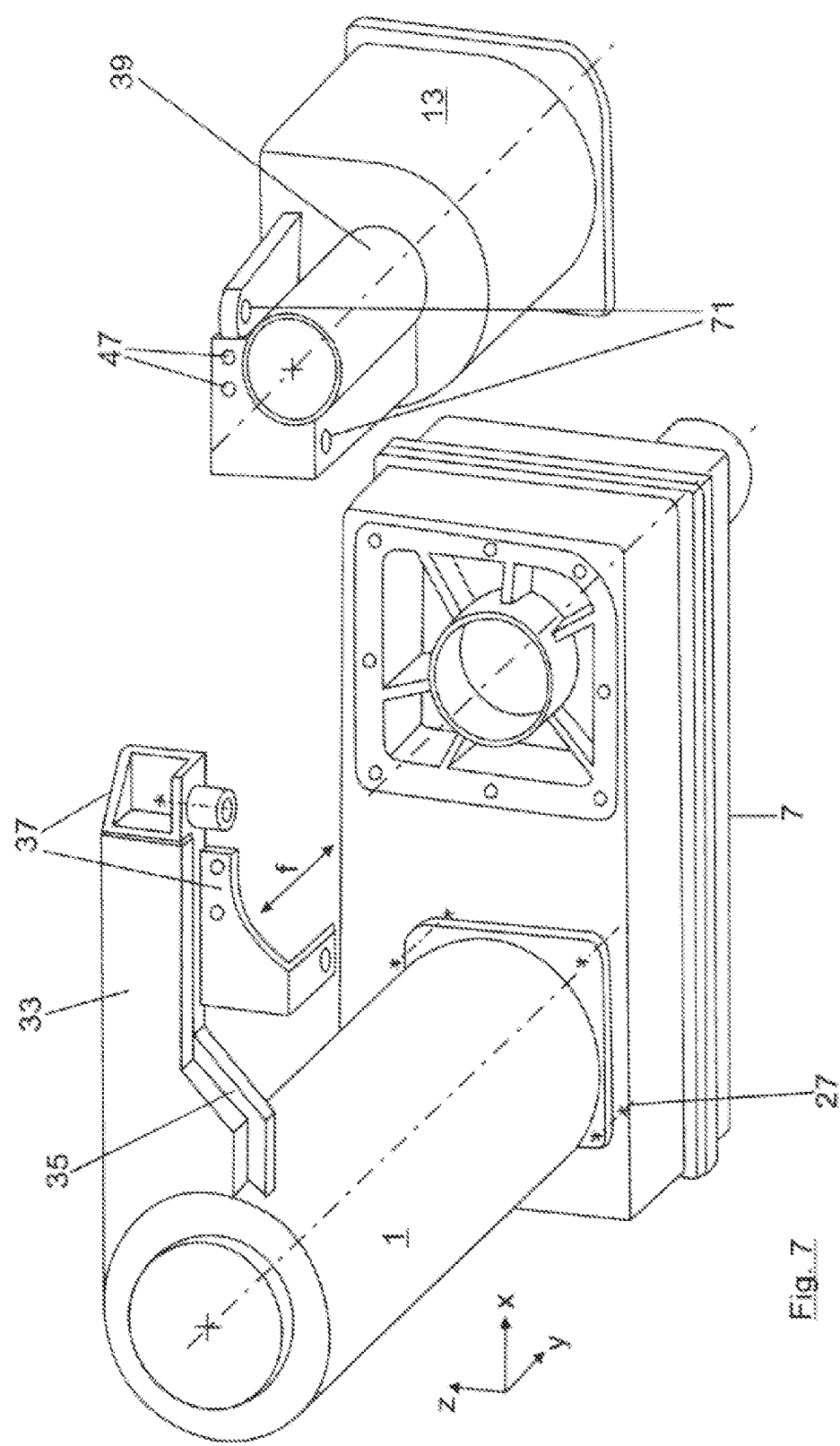
FIG. 7 shows a view in accordance with FIG. 2 of the drive device with an oil module which is still dismantled.

FIG. 7 shows the structural unit with an oil module 13 which is still dismantled. The structural unit has an assembly clearance f between the cantilever end 37 and the transmission 7. In a first process, the oil module 13 may be introduced into the assembly clearance f in an assembly direction x in a manner which may be free from interfering contours. Subsequently, a second process follows, in the case of which the oil module 13 is advanced by an advancing stroke in the axial direction y as far as into an assembly position. In the assembly position, the flange connection 29 between the oil module 13 and the transmission 7 can be established. In a final third process, the cantilever end 37 is braced at the bolt locations A, B to the oil module 13. Before the tensioning operation is carried out, the stop sleeve 49 may be brought into contact with the opening edge region 55 of the module-side internally threaded bore 47 (see FIG. 3).

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in *Superguide* v. *DIRECTV*, 358 F3d 870, 69 USPQ2d 1865 (Fed. Cir. 2004).

LIST OF DESIGNATIONS

1 Electric machine
3, 4 Drive shafts
5 Rotor shaft
7 Transmission
9 Input gearwheel
11 Axle differential
13 Oil module
15 Oil tank
17 Pressure pump
19, 21 Supply lines
23 Oil sump
25 Return pump
27, 29 Flange connections
31 Electronic power system
33 Contact housing
35 Cantilever
37 Cantilever end
39 Shaft leadthrough
41 Threaded bolt
43 Screw hole
45 Bolt shank
47 Module-side internally threaded bore
49 Stop sleeve
51 External thread
53 Screw hole internal thread
55 Opening edge region
57 Bolt head
61, 63 Tool attachments
65 Threaded bolt
67 Screw hole
69 Bolt shank
71 Module-side internally threaded bore
73 Adjusting sleeve
75 Bolt head
77 Opening edge region
$\Delta x$ Axial spacing
$\Delta h$ Oversize
$\Delta y$ Tolerance gap
f Assembly clearance
$l_1$ Sleeve length
$l_2$ Screw hole length
N Non-use position
S Supporting position A, B Bolt locations
a Overhang

The invention claimed is:

1. A drive device of an electrified vehicle axle of a vehicle with the drive device assemble-able in a structural unit with an electric machine which outputs via a transmission to drive shafts which lead to vehicle wheels of the electrified vehicle axle, and connectable with a module which supplies the electric machine and/or the transmission with coolant and/or lubricant, the electric machine, the transmission, and the module capable of being joined together to form the structural unit, in which the electric machine and the module are flange-connectable to the transmission to be spaced apart axially from one another, and, on a side of the electric machine which lies axially opposite the transmission, the electric machine having a cantilever that is radially protruding to bridge an axial spacing (Ax) from the module and which, at a free cantilever end of the cantilever, is attachable in a force-transmitting manner via at least one first bolt location to the module, the drive device comprising: a stop element provided at the free cantilever end of the cantilever of the electric machine, the stop element provided with an adjustable stroke between a non-use position and a supporting position, and spaced apart from a first module supporting face via a tolerance gap in the non-use position, the adjustable stroke of the stop element being adjustable before the at least one first bolt location is in a fixedly tensioned state, the adjustable stroke of the stop element being adjustable, using up the tolerance gap, until in contact with the first module supporting face, so that the free cantilever end and the module are braced to one another.

2. The drive device as claimed in claim 1, wherein the at least one first bolt location has a first threaded bolt to be guided through a first screw hole of the free cantilever end and to be brought by way of a first bolt shank of the first threaded bolt into threaded engagement with a first module-side internally threaded bore.

3. The drive device as claimed in claim 2, wherein,
the stop element is a stop sleeve which has a thread-free inner circumference and an outer circumference with an external thread, via which the stop sleeve is in threaded engagement with an internal thread of the free cantilever end (37), and
the internal thread is configured in the first screw hole of the free cantilever end, and/or the stop sleeve is actuatable by screwing for a stroke adjustment.

4. The drive device as claimed in claim 3, wherein,
the first bolt shank of the first threaded bolt is guidable through the stop sleeve, and/or
in the supporting position, an end side of the stop sleeve is in contact with an opening edge region of the first module-side internally threaded bore of the module, which opening edge region forms the first module supporting face.

5. The drive device as claimed in claim 3, wherein in the fixedly tensioned state, the free cantilever end including the stop sleeve is supported between a first bolt head of the first threaded bolt and an opening edge region of the first module-side internally threaded bore of the module, and the first bolt head is supported directly on a stop sleeve end side which faces away from the module, or the first bolt head is supported, independently of the stop sleeve, on the opening edge region of the first screw hole of the free cantilever end.

6. The drive device as claimed claim 3, wherein, the stop sleeve has, on an end side which faces away from the module, a tool attachment, via which the stop sleeve is actuatable by screwing, and the tool attachment of the stop sleeve and a tool attachment of the first threaded bolt are substantially identical, with result that the stop sleeve and the first threaded bolt are actuatable by way of an identical tool.

7. The drive device as claimed in claim 1, wherein, the at least one first bolt location is oriented axially parallel to an axis of the electric machine or to an axis of the module, and/or for a reduction of operationally induced vibrations, the free cantilever end is connectable via at least one second bolt location to the module, a screw axis of the at least one second bolt location is oriented at a right angle with respect to a screw axis of the at least one first bolt location.

8. The drive device as claimed in claim 7, wherein the at least one second bolt location has a second threaded bolt which is guidable through a second screw hole of the free cantilever end to be brought by way of a bolt shank of the second threaded bolt into threaded engagement with a second module-side internally threaded bore.

9. The drive device as claimed in claim 8, further comprising:
an adjusting sleeve with a small hole tolerance insertable into the second screw hole of the free cantilever end, sleeve length ($l_1$) of the adjusting sleeve is of greater dimensions than a screw hole length ($l_2$) of the free cantilever end, and
in the fixedly tensioned state, the adjusting sleeve is supported between a second bolt head and a second opening edge region of the second module-side internally threaded bore, and the free cantilever end is adjustable in an axial direction in sliding contact with an outer circumference of the adjusting sleeve, while lateral vibrations transversely with respect to the axial direction are blocked.

10. The drive device as claimed in claim 7, wherein while the module is dismantled, the structural unit has an assembly clearance (f) between the free cantilever end and the transmission, so that in a first process the module is introduceable without interfering contours into the assembly clearance (f), in a second process, the module is advanceable in an axial direction by an advancing stroke as far as into an assembly position, to establish a flange connection between the module and the transmission, and, in a third process, the free cantilever end is brace-able to the module at the at least one first bolt location and the at least one second bolt location, respectively.

11. The drive device as claimed in claim 1, wherein,
the electric machine is assigned an electronic power system which is arrangeable on an upper side of the structural unit, and
the cantilever has a contact housing for electric supply lines, via which the electronic power system is connectable to the electric machine.

* * * * *